Feb. 18, 1930.     H. J. DENHAM     1,747,818
MACHINE FOR PURIFYING CEREAL PRODUCTS
Filed June 18, 1928
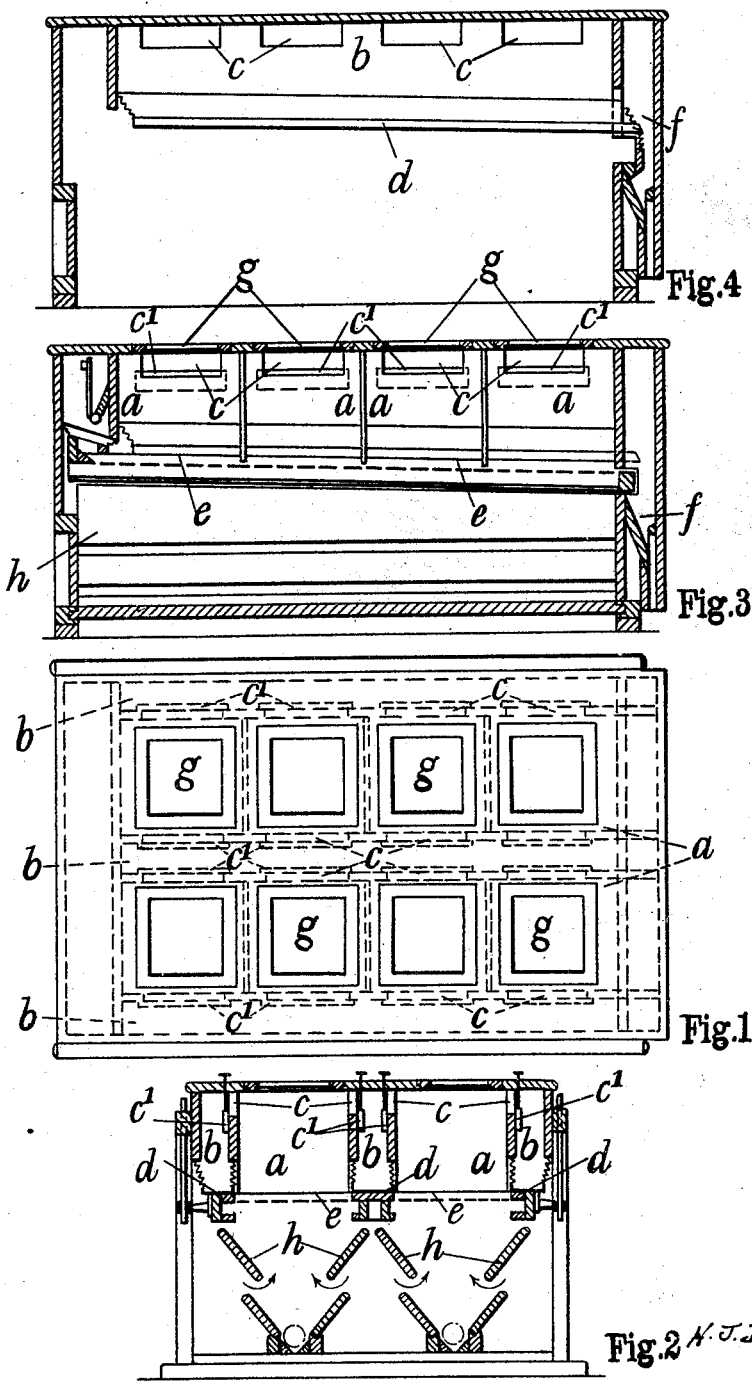

Patented Feb. 18, 1930

1,747,818

UNITED STATES PATENT OFFICE

HUMPHREY JOHN DENHAM, OF MANCHESTER, ENGLAND, ASSIGNOR TO HENRY SIMON LIMITED, OF MANCHESTER, ENGLAND, A BRITISH COMPANY

MACHINE FOR PURIFYING CEREAL PRODUCTS

Application filed June 18, 1928, Serial No. 286,429, and in Great Britain April 21, 1928.

This invention relates to machines for purifying cereal products of the type in which the said products are passed over a reciprocatory sieve through which a flow of air is induced by suitable means so that the lightest material is withdrawn by the draught, the heaviest material descends through the sieve and the medium material remains on the sieve and travels through the machine to the delivery chute.

The objects of the present invention are to ensure a more uniform flow of air through all parts of the sieve so as to obtain a more efficient purifying action, to provide a simplified construction of machine which takes up a minimum amount of headroom, allows of the convenient observation of the material upon the sieve, and is economical to build.

The invention comprises the combination with the inclosed chamber or space above the sieve, of air trunks disposed along the opposite sides of said chamber or space and each communicating with the upper part thereof, so producing a machine in which there is a more uniform pull or aspiration over the whole width of the sieve, which can be made low in build and which leaves the top enclosure of the chamber or space above the sieve free for the insertion of observation windows.

Referring to the accompanying sheet of explanatory drawings:—

Figure 1 is a plan and Figure 2 a sectional end elevation of a purifier constructed in accordance with this invention.

Figure 3 is a sectional side elevation through one of the compartmental separating chambers above the sieve and Figure 4 a similar view through one of the extraction air trunks.

Like reference letters in the different views indicate like parts.

In the machine illustrated there are two separating chambers or spaces $a$, each divided into a number of compartments, above a reciprocatory sieve $e$ which is arranged and operated in known manner. The said chambers or spaces $a$ are disposed side by side with an extraction air trunk $b$ (which may if desired be divided by a central partition) between their adjacent sides and similar trunks $b$ at the opposite sides as is clearly shown at Figure 2. Ports $c$ provide means of communication between the upper part of the chambers or spaces $a$ and the trunks $b$, and the usual valve plates or the like (not shown) are arranged to control such ports so as to regulate the effective area of the same as may be desired to ensure an efficient purifying and aspirating action in each compartment above the sieves.

By extracting the air from the chambers or spaces $a$ at both sides of the upper part of each such chamber or space, I obtain a very uniform pull or aspiration over the whole of the width of the sieves and thus a more efficient purifying or separating action on the grain passing along the sieves. I am also enabled to construct a machine of low and economical build in which the tops of the chambers or spaces $a$ are free for the insertion of inspection or observation windows $g$ directly over the sieves so that the whole of the latter can be examined, and in which such windows $g$ are at a height convenient for a person standing at the side of the machine.

It will be understood that the machine may comprise one sieve $e$ only with a compartmental chamber or space $a$ above it and two side air trunks as $b$.

I may make the bases $d$ of the air trunks $b$ separate from the upper portions of the trunk and connect them to the frame carrying the sieves $e$ so that they partake of the reciprocatory motion of the sieves. Thus the material which falls or deposits on such bases is carried forward in the same manner as the material remaining on the sieves $e$ to the delivery end $f$ of the machine. The said bases $d$ may be inclined downwards to such delivery end as are the sieves $e$.

The air is introduced to the machine by way of the louvres as $h$ which are arranged so that the main supply is by way of the lower apertures as indicated by the arrows in Figure 2, the upper apertures being restricted. By causing practically the whole of the air to impinge against the underside of the sieve at right angles thereto instead of at an angle across the same, I assist in ensuring a uniform distribution of the air flow through the whole of the sieves.

What I claim is:—

1. Machines for purifying cereal products comprising, in combination, a reciprocatory sieve base, a rectangular chamber above the sieve divided into compartments by vertical divisions, observation windows in the tops of the compartments giving a complete view of the sieve bottom of each compartment, ports in the chamber wall at the opposite sides of the upper part of each compartment, extraction air trunks extending along the opposite sides of such chamber and communicating with each compartment by said ports, and means for withdrawing deposited material from said air trunks.

2. Machines for purifying cereal products comprising, in combination, a reciprocatory sieve base, a rectangular chamber above the sieve divided into compartments by vertical divisions, observation windows in the tops of the compartments giving a complete view of the sieve bottom of each compartment, ports with adjustable valve plates thereon in the chamber wall at the opposite sides of the upper part of each compartment, extraction air trunks extending along the opposite sides of such chamber and communicating with each compartment by said valve controlled ports, the bases of said air trunks being separate from the trunks and being reciprocated along with the sieve base of the chamber to deliver the material which deposits in the air trunks.

3. Machines for purifying cereal products comprising two reciprocatory sieves disposed side by side, a rectangular chamber above each sieve divided into compartments by vertical divisions, observation windows in the tops of the compartments giving a complete view of the sieve bottom of each compartment, ports in the chamber walls at the opposite sides of the upper part of each compartment, an extraction air trunk between the two chambers communicating with each compartment of each chamber by said ports, and extraction air trunks at the outer sides of said chambers each communicating with each of the compartments of one chamber by said ports, the bases of the three air trunks being separate from the trunks and being reciprocated along with the sieve bases of the chambers to deliver the material which deposits in the air trunks.

In testimony whereof I have signed my name to this specification.

HUMPHREY JOHN DENHAM.